UNITED STATES PATENT OFFICE.

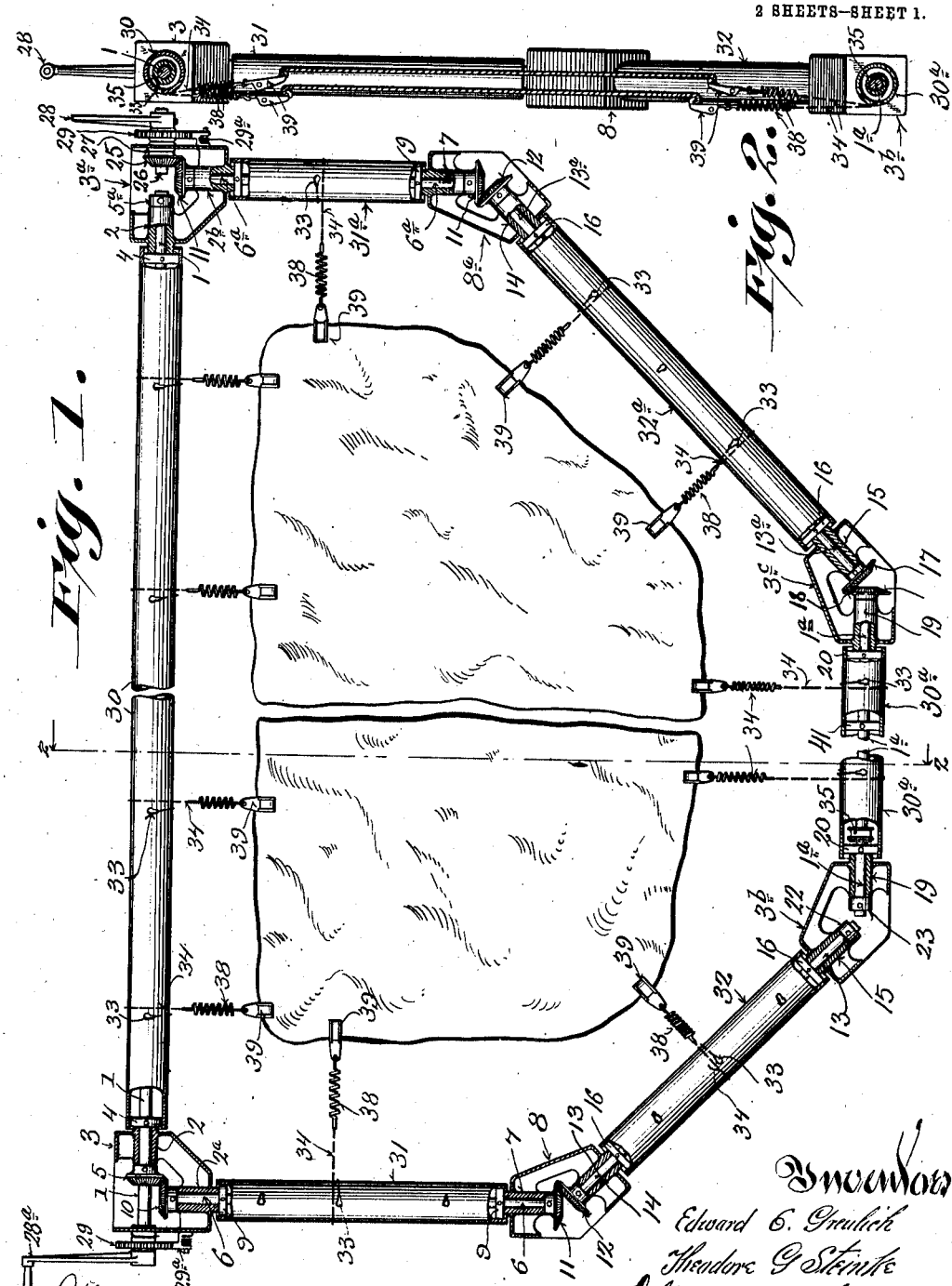

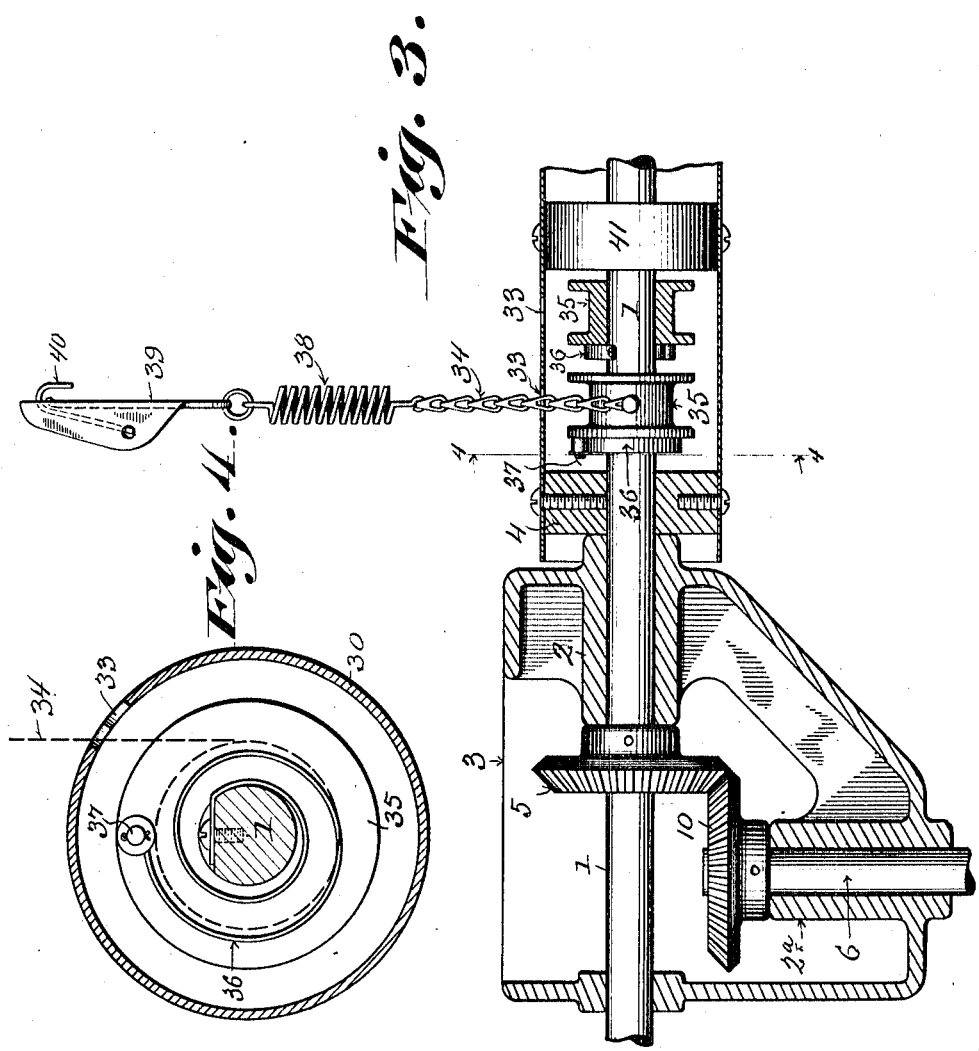

EDWARD C. GREULICH AND THEODORE G. STEINKE, OF MILWAUKEE, WISCONSIN.

STRETCHER FOR LEATHER OR ANALOGOUS MATERIAL.

988,331.  Specification of Letters Patent.  Patented Apr. 4, 1911.

Application filed December 12, 1910. Serial No. 596,944.

*To all whom it may concern:*

Be it known that we, EDWARD C. GREULICH and THEODORE G. STEINKE, both citizens of the United States, and residents of Milwaukee, in the county of Milwaukee and State of Wisconsin, have invented certain new and useful Improvements in Stretchers for Leather or Analogous Material; and we do hereby declare that the following is a full, clear, and exact description thereof.

The object of our invention is to provide simple, durable and efficient stretching machines especially designed to be used in connection with stretching leather or hides, the arrangement and construction being such that one or more layers of leather stock may be independently and yieldably secured to a polygonal endless frame composed of roller sections in gear connection, whereby the sections may be rotated to cause the desired stretch of the stock in all directions.

With the above object in view our invention consists in certain peculiarities of construction and combination of parts to be hereinafter set forth with reference to the accompanying drawings and subsequently claimed.

In the drawings Figure 1 represents an elevation of a stretcher frame embodying the features of our invention, with parts broken away and parts in section to illustrate certain structural features; Fig. 2, a cross-section of the same as indicated by line 2—2 of Fig. 1; Fig. 3, an enlarged detail sectional elevation of a fragment of the frame, and Fig. 4, a detail cross-section as indicated by line 4—4 of Fig. 3, the cross-section showing one of the gripping members and its connections.

Referring by characters to the drawings the stretcher frame is composed of a main longitudinal shaft 1 that is journaled at its opposite ends in boxes 2 of coupling brackets 3 and 3ª, the shaft being held against lateral movement in its boxes by collars 4, 4, and the hub of a beveled gear-wheel 5, together with a collar 5ª that is utilized as a substitute for the beveled wheel hub which is housed in the bracket 3. Journaled in other boxes 2ª, 2ᵇ, of the housings 3 and 3ª are the ends of transversely disposed shafts 6, 6ª, the opposite ends of the shafts being journaled in boxes 7 of intermediate coupling brackets 8, 8ª. Adjacent to the opposite ends of both of these shafts are thrust-collars 9 adapted to abut the journals of the respective couplings, the opposite ends of each of said shafts being provided with beveled gear-wheels 10 and 11. The beveled gear-wheel 10 of shaft 6 is meshed with the beveled gear-wheel 5 of the main shaft 1, while the opposite gear-wheels 11 of each of the transverse shafts 6, 6ª, are meshed with gear-wheels 12 that are carried by obliquely disposed corner shafts 13, 13ª, the gear-wheels being secured to ends of the latter. Ends of the shafts 13 and 13ª are journaled in boxes 14 of the intermediate brackets 8 and 8ª respectively, the opposite ends of said shafts being journaled in boxes 15 of coupling brackets 3ᵇ and 3ᶜ, it being understood that these shafts are held against end-thrust by collars 16 in a similar manner to that described in connection with the main shaft. That end of the corner shaft 13ª which is journaled in the coupling bracket 3ᶜ, carries a beveled gear-wheel 17 that meshes with a gear-wheel 18 carried by a longitudinal shaft 1ª, which shaft parallels the main shaft 1 and is journaled in boxes 19 of the housings 3ᵇ, 3ᶜ. This last named shaft 1ª completes a continuous polygonal frame, the said shaft being provided with thrust collars 20 and the beveled gear-wheel 18 that meshes with the beveled gear-wheel 17 of the corner shaft 13ª. The opposite ends of shafts 1ª and 13 that are incased in the housing 3ᵇ are each provided with a set collar 22, 23, respectively, Thus continuous gear connection between the shafts is broken at this junction, whereby the device as a whole comprises two independently driven sets of shafts, the source of drive being hereinafter described.

Motion is imparted to one set of shafts by a beveled gear-wheel 25, in meshed engagement with the gear-wheel 11 of shaft 6ª, the gear-wheel 25 being secured to a stud 26 that is journaled in a box 27 of the coupling bracket 3ª, the stud being provided with a hand-crank 28, whereby power is applied. The opposite series of shafts is driven through the miter-gears 5 and 10 respectively incased in coupling-bracket 3, power being applied by means of a hand-crank 28ª that is secured to an extension of shaft 1, which extension is journaled in said coupling bracket. Both the stud 26 and shaft 1 also carry ratchet-wheels 29 that are engaged by spring-pawls 29ª whereby the said stud and shaft are locked against movement in one direction incidental to a stretching operation.

From the foregoing description it will be seen that the several shafts, in conjunction with the coupling-brackets which form bearings therefor, constitute a rigid endless frame, the coupling brackets being held against motion or twisting by their boxes which engage the several shafts.

Secured to the sets of thrust collars 4, 9, 16 and 20 of the respective shafts 1, 1ª, 6, 6ª, and 13, 13ª, and sleeved thereon, are tubular roller sections 30, 30ª, 31, 31ª, and 32, 32ª, with their ends abutting the several pairs of coupling brackets. These tubular rollers are provided with a series of key-hole slots 33, through each of which is passed a belt or chain 34, the inner end of which chain is secured to a drum 35 that is rotatably mounted upon its respective shaft. Rotation of the drum is controlled by an elliptical spring 36 coiled around the shaft and having one end secured thereto, the opposite end of the spring being fastened to a pin 37 that extends from one face of the drum. The outer end of each chain carries a coiled spring 38 that is linked to a grip 39, each of which grips is shown being provided with a hinged jaw 40, between which jaw and the edge of the body portion of the grip the leather stock to be stretched is held.

In order to add rigidity to the several tubular rollers the same may be reinforced at intervals by collars 41 that are similar to the thrust collars described, being mounted upon the several shafts and adapted to fit the inner bore of the rollers snugly.

It should be understood that while we have shown a limited number of spring-controlled drums and attaching grips that, in practice, the several shafts are provided with a sufficient number of drums suitably spaced apart to practically fill up the length of each shaft, whereby the capacity of the stretcher is increased to its maximum. Hence, if two or more hides or leather blanks are to be stretched, they can be accommodated by adjusting the same to the stretcher one above the other as shown in Fig. 2, in which instance one series of grips are drawn out over their seats upon the rollers and affixed to the first leather blank. Thereafter a second set of grips is similarly adjusted to the next blanks and so on until the full capacity of the stretcher has been utilized. The hand-cranks 28 are then set in motion with the result that the rollers are revolved, causing the chains to enter the restricted throat portion of their several key-hole slots, whereby they are locked or gripped. Further rotation of the rollers causes the chains to wind thereupon and the stock is stretched in all directions simultaneously, the coiled springs 38 permitting yield whereby compensation is had with reference to uneven stretch of the stock at any particular point.

When moist hides are stretched the coiled springs also serve, by yielding, to compensate for shrinkage in said hides incidental to drying out of the same, it being understood that said hides remain in the stretcher until cured.

We claim:

1. A polygonal sided stretcher comprising a series of angularly disposed shafts, coupling brackets having boxes in which the opposite ends of the shafts are journaled, driving means connecting the shaft-ends within the coupling-boxes, apertured tubular rollers mounted upon the shafts, spring-controlled drums loosely mounted upon the shafts within the tubular rollers, belts secured to the drums and extending through the roller apertures, and grips carried by the belts.

2. A polygonal sided stretcher comprising a series of angularly disposed shafts, coupling-brackets having boxes in which the opposite ends of the shafts are journaled, gears connecting certain of the shafts in independent series, the gears being mounted within the coupling brackets, and a plurality of grips in flexible connection with the shafts.

3. A polygonal sided stretcher comprising a series of angularly disposed shafts, coupling brackets having boxes in which the opposite ends of the shafts are journaled, beveled gears connecting certain of the shafts in series, apertured tubular rollers mounted upon the shafts, spring-controlled drums loosely mounted upon the shafts within the tubular rollers, belts secured to the drums and extending through the roller apertures, and grips in yielding connection with the belts.

In testimony that we claim the foregoing we have hereunto set our hands at Milwaukee in the county of Milwaukee and State of Wisconsin in the presence of two witnesses.

EDWARD C. GREULICH.
THEO. G. STEINKE.

Witnesses:
  GEO. W. YOUNG,
  CASANDRE YOUNG.